F. A. TRAHIN.
ENGINE MANIFOLD.
APPLICATION FILED OCT. 24, 1917.
1,307,604.
Patented June 24, 1919.
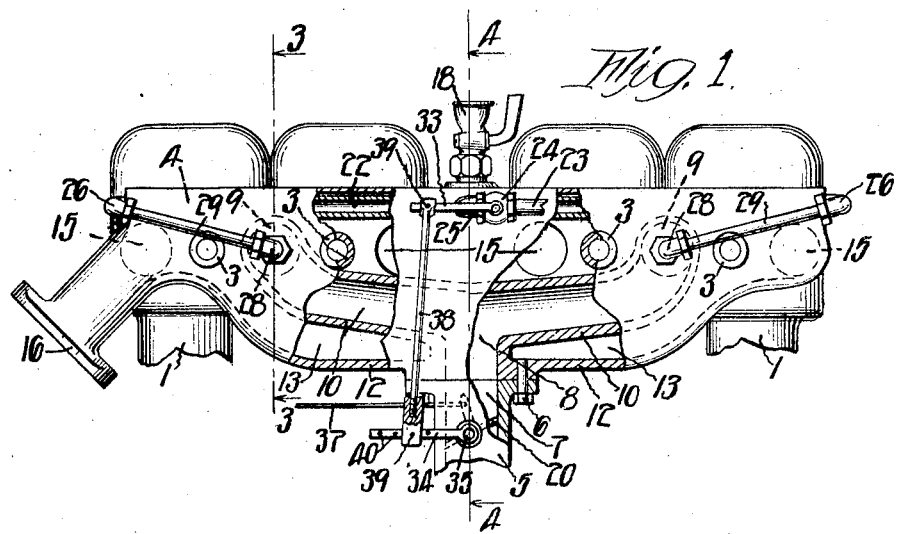
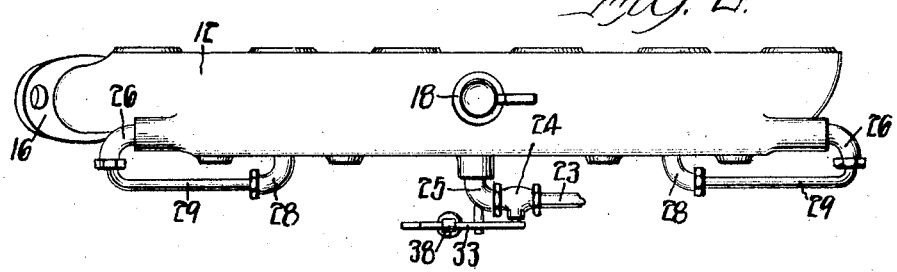
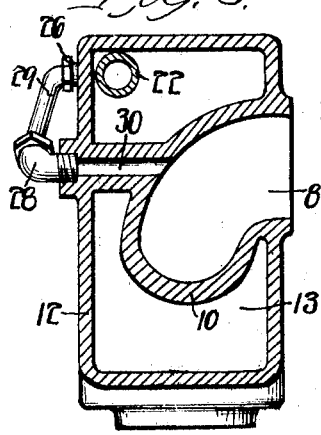
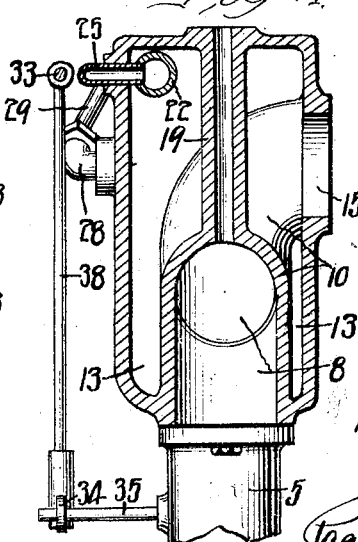
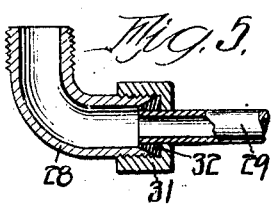
Inventor
Frank A. Trahin,
Witness

UNITED STATES PATENT OFFICE.

FRANK A. TRAHIN, OF DETROIT, MICHIGAN.

ENGINE-MANIFOLD.

1,307,604.

Specification of Letters Patent. Patented June 24, 1919.

Application filed October 24, 1917. Serial No. 198,287.

*To all whom it may concern:*

Be it known that I, FRANK A. TRAHIN, a citizen of the United States, and residing at Detroit, in the county of Wayne and State of Michigan, have invented a new and Improved Engine-Manifold, of which the following is a specification.

The present invention relates to a manifold for an internal combustion engine whereby kerosene or the like may be readily utilized as fuel. It consists in a combined intake and exhaust manifold wherein the intake passages are surrounded by and heated from the exhaust passages, together with a steam generating pipe or passage disposed within and protected by the exhaust passage, said steam pipe having its end portions communicating with the discharge ends of the intake passages; the invention further consists in means for admitting water to the generator at will and substantially in accordance with the normal demands of the engine; in a primer located above the intake end of the intake passage of the manifold and communicating therewith by a pipe or the like which passes through the exhaust passage; and in certain other details of construction shown, described and claimed.

In the drawings, Figure 1 is a side elevation, parts being broken away, showing a preferred embodiment of the invention. Fig. 2 is a plan view corresponding thereto, the cylinders being omitted. Figs. 3 and 4 are sections on the lines 3—3 and 4—4, respectively, of Fig. 1, the primer being omitted in Fig. 4. Fig. 5 is a longitudinal section showing a preferred form of connection between the external steam conducting pipes and the fittings therefor.

1 indicates the cylinders of an internal combustion engine—the number may vary, four being shown—and secured thereto in any suitable way, for example, by bolts (not shown) which pass through perforated bosses or stiffeners 3, is a combined intake and exhaust manifold designated as a whole by 4. A carbureter 5 of any preferred design is attached to the lower side of the manifold by bolts 6 and has its mixture passage 7 in communication with the T-shaped intake passage 8 whereby the combustible mixture is alternately delivered to the cylinder intake passages 9 on opposite sides of the transverse central plane of the engine.

The walls 10 of the passage 8 are inclosed by and formed integral with the walls 12 which form an exhaust passage 13 through which the hot gases travel from the exhaust passages 15 back to a pipe (not shown) which is bolted to the flanges 16. A primer cup or valve 18 and pipe 19 allow gasolene or other priming fuel to be dropped directly down upon the butterfly or other throttle valve 20 of the carbureter, thus providing the rich mixture requisite for starting purposes.

Extending longitudinally from end to end of the manifold through the passage 13 is a pipe or steam generator 22 about which the main portion of the manifold is cast. Water is delivered to substantially the midpoint of the pipe 22 from a supply pipe 23 through the valve 24 and fitting 25, and the steam generated is conducted through the fittings 26 and 28, the pipe 29 and passages 30 (Fig. 3) to the intake passage 8 near the point where it communicates with the corresponding passage 9. A check valve (not shown) may be used in the pipe line 23. The connection between the pipes 29 and the fittings 26 or 28 may be made in various ways—as shown (Fig. 5) the end of the fitting is threaded to receive a compression collar 31 by which a tapered sealing ring 32, which coöperates with a tapered seat in the fitting, is pressed inwardly upon the smooth outer surface of the end of the pipe.

The supply of water to the generator might be independent of the supply of the fuel mixture, but it is preferred to connect the handle 33 of the valve 24 to an arm 34 rigid with the stem 35 of the throttle valve 20, whereby, when the throttle rod 37 is actuated to open the throttle, the water is admitted at a rate which most nearly corresponds to the demands of the engine. For this purpose a link 38 and pins 39 may be used. It is also preferred to perforate one of the members 33 or 34 or both at a series of points 40 to receive the corresponding pin, or to in some other way provide for a relative angular adjustment between the valves 20 and 24 whereby the proportions of water and fuel mixture may be adjusted in respect to one another.

The actual details of construction may, of course, be varied considerably without departing from the spirit of the invention; I do not, therefore, wish to be limited except as indicated by the subjoined claims.

I claim:—

1. A manifold for internal combustion engines comprising a unitary box-like member forming an exhaust passage and an intake passage, said intake passage having a plurality of discharge openings, a steam generator inclosed by said exhaust passage and extending longitudinally thereof, means for supplying water to the generator, and means for connecting the end portions of the generator to the intake passage near the corresponding discharge opening.

2. A manifold comprising a unitary hollow elongated member adapted to extend along the side of the cylinders of an engine substantially from end to end to form an exhaust passage therefor, said member forming within the exhaust passage a divided intake passage having a plurality of discharging openings adapted to deliver fuel mixture to the different cylinders, a steam generator within the confines of the manifold and having one wall exposed to the heat of the exhaust gases, said generator extending longitudinally of the manifold, means for supplying water to the generator, and passage forming means connecting the generator to the intake passage near the discharge openings.

3. A manifold for internal combustion engines comprising a hollow member forming a relatively short passage for fuel mixture and a relatively long passage for exhaust gases overlapping the first named passage at both ends, a steam generator within the second named passage, means for supplying water to the generator, and means for conducting steam from the ends of the generator to the corresponding ends of the first named passage.

4. A manifold for internal combustion engines comprising a hollow member forming a relatively short passage for fuel mixture and a relatively long passage for exhaust gases overlapping the first named passage at one end, a steam generator extending longitudinally of the second named passage, means for supplying water to the generator, and means for conducting steam from one end of the generator to the corresponding end of the first named passage, said means including a walled passage which extends transversely through the passage for the exhaust gases.

5. A manifold for internal combustion engines comprising a hollow exhaust manifold having means for forming a transverse passage therein adapted to connect with an intake passage of the engine, a steam generator extending longitudinally of the exhaust manifold in position to be heated by the hot gases therein, means for connecting one end of the generator to the transverse passage, and means for supplying water to the generator.

6. A manifold for internal combustion engines comprising a hollow exhaust manifold having means for forming a transverse passage therein adapted to connect with an intake passage of the engine, a steam generator extending longitudinally of the exhaust manifold in position to be heated by the hot gases therein, a pipe, external to the hollow manifold, for connecting one end of the generator to the transverse passage, and means for supplying water to the generator.

FRANK A. TRAHIN.